United States Patent

Han et al.

(10) Patent No.: US 11,411,719 B2
(45) Date of Patent: Aug. 9, 2022

(54) SECURITY SYSTEM AND METHOD THEREOF USING BOTH KMS AND HSM

(71) Applicant: KOREA ADVANCED INSTITUTE OF SCIENCE AND TECHNOLOGY, Daejeon (KR)

(72) Inventors: Dongsu Han, Daejeon (KR); Juhyeng Han, Daejeon (KR); Seongmin Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 92 days.

(21) Appl. No.: 16/985,266

(22) Filed: Aug. 5, 2020

(65) Prior Publication Data

US 2021/0143984 A1 May 13, 2021

(30) Foreign Application Priority Data

Nov. 8, 2019 (KR) .................... 10-2019-0142651

(51) Int. Cl.
 *H04L 29/06* (2006.01)
 *H04L 9/08* (2006.01)
 *H04L 9/32* (2006.01)

(52) U.S. Cl.
 CPC ............ *H04L 9/083* (2013.01); *H04L 9/0825* (2013.01); *H04L 9/0897* (2013.01); *H04L 9/3215* (2013.01)

(58) Field of Classification Search
 USPC .................................................. 726/3–5, 9
 See application file for complete search history.

(56) References Cited

U.S. PATENT DOCUMENTS 8,799,997 B2 * 8/2014 Spiers .................. G06F 21/575
 713/2
2005/0213768 A1 * 9/2005 Durham ................. H04L 9/083
 380/278

(Continued)

FOREIGN PATENT DOCUMENTS

KR 10-0642940 B1 11/2006
KR 10-2008-0054792 A 6/2008

(Continued)

OTHER PUBLICATIONS

Juhyeng Han, et al., "Toward Scaling Hardware Security Module for Emerging Cloud Services", (Paper), SysTEX'19, Oct. 27, 2019, 6 pages, Huntsville, Canada.

(Continued)

*Primary Examiner* — Maung T Lwin
(74) *Attorney, Agent, or Firm* — Sughrue Mion, PLLC

(57) ABSTRACT

The present disclosure in some embodiments provides a security system using both key management service (KMS) and a hardware security module (HSM), and a method of operating the security system. At least one embodiment provides a security system including an HSM, a bootstrapping enclave, and one or more KMS enclaves. The HSM is configured to generate, replace or remove a root key, the HSM being physically independent. The bootstrapping enclave is configured to receive the root key from the HSM. The one or more KMSs are configured to perform an attestation procedure with the bootstrapping enclave, to receive the root key from the bootstrapping enclave, and to utilize the root key for establishing a secure channel with the HSM.

12 Claims, 3 Drawing Sheets

(56) References Cited

U.S. PATENT DOCUMENTS

| | | | | |
|---|---|---|---|---|
| 2010/0306485 | A1* | 12/2010 | Dubhashi | H04L 61/15 |
| | | | | 711/162 |
| 2013/0067243 | A1* | 3/2013 | Tamayo-Rios | G06F 21/6218 |
| | | | | 713/193 |
| 2014/0053227 | A1* | 2/2014 | Ruppin | H04L 67/06 |
| | | | | 726/1 |
| 2015/0256332 | A1* | 9/2015 | Raj | H04L 9/0877 |
| | | | | 713/150 |
| 2016/0105427 | A1* | 4/2016 | Bobbitt | H04L 9/32 |
| | | | | 713/158 |
| 2017/0012774 | A1* | 1/2017 | Antoni | H04W 12/10 |
| 2019/0028281 | A1* | 1/2019 | Turissini | G09C 1/00 |
| 2019/0140852 | A1* | 5/2019 | Kreft | G06F 21/71 |
| 2019/0260718 | A1* | 8/2019 | Buendgen | H04L 9/0822 |
| 2020/0313890 | A1* | 10/2020 | Mondello | H04L 9/3278 |

FOREIGN PATENT DOCUMENTS

| | | |
|---|---|---|
| KR | 10-2016-0129852 A | 11/2016 |
| WO | 2015134760 A2 | 9/2015 |

OTHER PUBLICATIONS

Juhyeng Han, et al., "Toward Scaling Hardware Security Module for Emerging Cloud Services", (Presentation), 4th Workshop on Software for Trusted Execution (SysTEX'19), Oct. 27, 2019, 61 pages.

* cited by examiner

SECURITY SYSTEM AND METHOD THEREOF USING BOTH KMS AND HSM

CROSS-REFERENCE TO RELATED APPLICATIONS

The present application is based on, and claims priority from, Korean Patent Application Number 10-2019-0142651, filed Nov. 8, 2019, the disclosure of which is incorporated by reference herein in its entirety.

TECHNICAL FIELD

The present disclosure in some embodiments relates to a security system and a method of operating the security system implementing a framework for extending a security service by using a Key Management Service (KMS) and a Hardware Security Module (HSM).

BACKGROUND

The statements in this section merely provide background information related to the present disclosure and do not necessarily constitute prior art.

An HSM (hardware security module) is security-only hardware that generates, replaces, or removes security keys. The HSM is physically independent hardware, protecting cryptographic key operations such as signing certificates and allowing limited access only through the network interface. The HSM can provide a high level of security, so it is used to protect numerous cloud applications and network commerce. For example, the HSM is widely used for data security in online services that require digital key management such as public key infrastructure (PKI) environments, e-commerce payment systems, and certificate authorities (CAs).

HSMs are designed to provide a high level of physical security. Cryptographic operations and key management are performed within isolated hardware of HSMs which are thus utilized for various key management services. Latest HSM devices are fast enough to perform thousands of cryptographic operations per second, and they can meet the FIPS 140-2 Level 3 or Level 4 standards, which are security standards.

On the other hand, the rapid innovation of emerging industries such as micro services, edge computing, and financial technologies demands the scalability of security services. Recent software applications and web services employ a decentralized approach to minimize latency for numerous mobile and IoT transactions. The service provider divides the conventional cloud based single structure service into several micro services and provides them to the user. This increases user-to-service transactions and service-to-service transactions that require security. The more the user-to-service transactions and service-to-service transactions, the heavier the workload burden HSMs have performing cryptographic tasks. In other words, a bottleneck may occur when the HSM performs all cryptographic operations.

In addition, HSM has the disadvantage of low elasticity or scalability to user demand. As the HSM performs tasks related to the root key and the throughput of cryptographic requests increases, the resource utilization and network utilization by the HSM increase, which can become a bottleneck of a large-scale service. Attempts to solve this issue require a significant capital investment to have more HSMs.

To provide a scalable security service to a user, a key management service (KMS) based on a trusted execution environment (TEE) is used. Software-based KMS for cloud environment can guarantee scalability over HSM. KMS serves the same functions as HSM, but it has high scalability for application program development and integration. In addition, the KMS can be horizontally expanded according to the user's request, reducing latency of the operation compared to the HSM. In particular, the KMS enclave using the enclave can provide a high security service.

Enclave refers to an instance or memory region located inside a processor. An enclave ensures stability because it undertakes security procedures whenever data is exchanged with external apparatuses. Specifically, the enclave is a coprocessor or instance manufactured in a system-on-chip (SoC). The enclave uses encrypted memory and performs cryptographic operations by using a hardware random number generator. The enclave performs all cryptographic operations to manage data protection keys and can ensure the integrity of data protection even if the kernel is compromised. In addition, communication between the enclave and the application processor is limited to interrupt-driven mailboxes and shared memory data buffers.

However, the KMS enclave, which is not physically separated from other apparatuses, suffers from a lower security capability than that of the HSM.

Therefore, there is a need for a technique capable of using both the security of the HSM and the scalability of the KMS enclave and ensuring the validation between the HSM and KMS enclaves.

SUMMARY

In at least one aspect, the present disclosure provides a hardware security module (HSM), a bootstrapping enclave, and one or more key management service (KMS) enclaves. The HSM is configured to generate, replace or remove a root key, the HSM being physically independent. The bootstrapping enclave is configured to receive the root key from the HSM. The one or more KMSs are configured to perform an attestation procedure with the bootstrapping enclave, to receive the root key from the bootstrapping enclave, and to utilize the root key for establishing a secure channel with the HSM.

In another aspect, the present disclosure provides a method of operating a security system, including generating a root key by an HSM that is physically independent, transmitting the root key by the HSM to a bootstrapping enclave, perform in an attestation procedure by the bootstrapping enclave with one or more KMS enclaves, transmitting the root key by the bootstrapping enclave to the one or more KMS enclaves, and establishing a secure channel by the one or more KMS enclaves with the HSM by using the root key.

DETAILED DESCRIPTION

Figure 1:
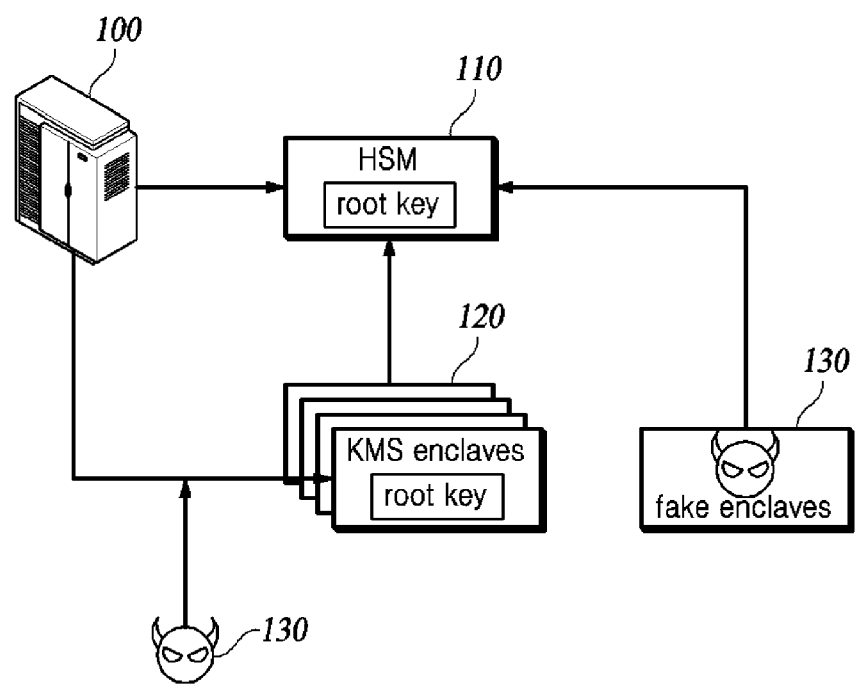
FIG. 1 is a view illustrating a security system using KMS enclaves and an HSM.

The present disclosure in some embodiments seeks to provide a security system which manages a key by using a hardware security module (HSM) and processes a client's cryptographic operation request by using a key management module (KMS) enclave, thereby ensuring both service scalability and security, and which guarantees the reliability between the HSM and the KMS enclave by using a bootstrapping enclave, and to provide a method of operating the security system.

Some exemplary embodiments of the present disclosure are described below with reference to the accompanying drawings. In the following description, like reference numerals would rather designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto. The terms such as "unit," "module," and the like refer to units for processing at least one function or operation, which may be implemented by hardware, software, or a combination thereof.

The following assumes that an attacker is trying to attack the security system according to at least one embodiment of the present disclosure. The attacker can control all software components, including the operating system (OS) and hypervisor. The hardware of HSM itself ensures security through hardware separation, but since the attacker has full control over the host OS and library, there is no trust guaranteed in the communication channel with the external host.

FIG. 1 is a view illustrating a security system using KMS enclaves and an HSM.

As shown in FIG. 1, the security system may use a client 100, an HSM 110, and one or more KMS enclaves 120 and assume attackers 130.

When the client 100 requests a cryptographic operation to the HSM 110, the HSM 110 performs data processing related to the cryptographic operation. The HSM 110 is a module that is physically separated from other components, and it may physically block access by the attackers 130. Therefore, the HSM 110 ensures security.

However, when the client 100 transmits requests for a lot of cryptographic operation, such as micro services, to the HSM 110, a bottleneck occurs due to low scalability of the HSM 110.

When the client 100 requests a cryptographic operation to one or more KMS enclaves 120, the one or more KMS enclaves 120 perform data processing related to the cryptographic operation. The one or more KMS enclaves 120 are configured to be incremental flexibly according to the demand of the client 100. However, although one or more KMS enclaves 120 may provide micro services to the client 100, they are not physically separated contrary to the HSM 110 and thus are vulnerable in terms of security.

The attacker 130 may intrude between the client 100 and one or more KMS enclaves 120 to commit a middle attack. In particular, the attacker 130 may request a cryptographic operation to the HSM 110 by using a middle in the man (MITM) technique, and transmit its manipulated cryptographic processing result to the one or more KMS enclaves 120.

Using both the HSM 110 and one or more KMS enclaves 120 may enable the attacker 130 to generate a fake enclave to access the HSM 110. Unless validation is performed between the HSM 110 and one or more KMS enclaves, the HSM 110 may transmit the root key to the attacker 130.

Therefore, there is a need for a method to secure the key against the attacker 130 while utilizing both the security of the HSM 110 and the scalability of the one or more KMS enclaves 120.

Figure 2:
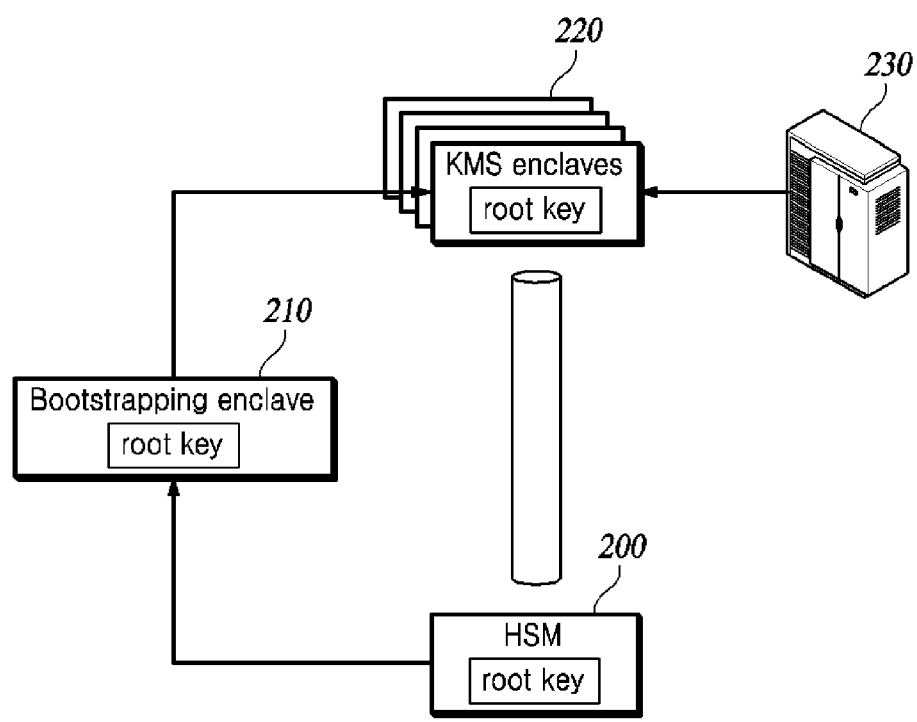
FIG. 2 is a diagram for explaining an example configuration of a security system according to at least one embodiment of the present disclosure.

FIG. 2 is a diagram for explaining an example configuration of a security system according to at least one embodiment of the present disclosure.

As shown in FIG. 2, the security system according to at least one embodiment of the present disclosure includes a hardware security module (HSM) 200, a bootstrapping enclave 210, and one or more KMS enclaves 220. The security system may provide a security service to a client 230 by performing a cryptographic operation according to the request of the client 230.

At least one of the HSM 200, the bootstrapping enclave 210, and the EMS enclaves 220 may use a direct circuit structure, such as a memory, a processor, a logic circuit, a look-up table, etc. that may execute the respective functions described herein through controls of one or more microprocessors or other control apparatuses. Also, at least one of the HSM 200, the bootstrapping enclave 210, and the EMS enclaves 220 may be specifically embodied by a program, or a part of code, which contains one or more executable instructions for performing specified logic functions, and executed by one or more microprocessors or other control apparatuses. Further, at least one of the HSM 200, the bootstrapping enclave 210, and the EMS enclaves 220 may include or may be implemented by a processor such as a central processing unit (CPU) that performs the respective functions, a microprocessor, or the like.

The HSM 200, which generates, replaces or removes a root key, is a physically independent component. Upon generating a root key that is used to form a secure channel with one or more KMS enclaves 220, the HSM 200 sends the root key to the bootstrapping enclave 210. The HSM 200 may replace or destroy the root key as needed. In sum, the physically independent HSM 200 stores the root key. In other words, the HSM 200 stores the root key because one or more KMS enclaves 220 cannot preserve physical tamper evidence unlike the HSM 200.

The HSM 200 according to at least one embodiment of the present disclosure may be physically independent from other components. In addition, since the HSM 200 is physically independent, it can send the root key offline to the bootstrapping enclave 210 for security.

In order to use the public key encryption method according to at least one embodiment of the present disclosure, the HSM 200 may generate a public key and a secret key for a root key, wherein the secret key may be used interchangeably with a private key hereinafter. In this case, the HSM 200 transmits the public key to the bootstrapping enclave 210. In particular, when the root key transmitted to the bootstrapping enclave 210 is the public key, the HSM 200 further generates, replaces, and manages the private key that is paired with the public key. Here, the public key is shared with the HSM 200, the bootstrapping enclave 210 and the one or more KMS enclaves 220 only, and not with the client 230. The private key is stored and managed by the HSM 200 and is used to decrypt data encrypted by one or more KMS enclaves.

Specifically, the HSM 200 may transmit a public key to the bootstrapping enclave 210. The HSM 200 sends the public key to the bootstrapping enclave 210. Responsive to the presence of one or more KMS enclaves 220 that have received the public key from the bootstrapping enclave 210, the HSM 200 establishes a secure channel with the one or more KMS enclaves 220 by using the public key. In addition, responsive to when one or more KMS enclaves 220 transmit encrypted data to the HSM 200 through the secure channel, the HSM 200 may utilize the private key to decrypt the encrypted data.

Conversely, the HSM 200 according to at least one embodiment of the present disclosure may generate and transmit a session private key for establishing a secure channel to the bootstrapping enclave 210. Here, the session private key is distinguished from the root private key used for data cryptographic operations. When the HSM 200 transmits a session private key to the bootstrapping enclave 210 and in response to the presence of one or more KMS enclaves 220 that have received the session private key from the bootstrapping enclave 210, the HSM 200 may establishes a secure channel with the one or more KMS enclaves 220 by using the session private key. In addition, responsive to when one or more KMS enclaves 220 transmit encrypted data to the HSM 200 through the secure channel, the HSM 200 may utilize the public key to decrypt the encrypted data.

The bootstrapping enclave 210 is a component that receives a root key from HSM 200 and performs an attestation procedure for one or more KMS enclaves 220. In addition, the bootstrapping enclave 210 may transmit the root key to one or more KMS enclaves 220.

The bootstrapping enclave 210 according to at least one embodiment of the present disclosure transmits the root key only to the attested KMS enclave(s) among the one or more KMS enclaves 210. This is to prevent an attacker from generating a fake enclave and accessing the HSM 200.

The bootstrapping enclave 210 needs to be implemented by a reliable service provider. Being a component for performing validation between the HSM 200 and one or more KMS enclaves 220, the bootstrapping enclave 210 is implemented for the client 230 to rely on.

At least one KMS enclave 220 is a component that performs an attestation procedure with the bootstrapping enclave 210, receives the root key from the bootstrapping enclave 210, and establishes a secure channel with the HSM 200 by using the root key.

The at least one KMS enclave 220 performs the operation required for a cryptographic operation on behalf of the HSM 200. For example, when the client 230 establishes frequent transport layer security (TLS) connections for a short period of time, storing all session keys in the HSM 200 may cause a performance bottleneck, failing to achieve a service level objective (SLO). Accordingly, at least one KMS enclave 220 performs a cryptographic operation at the request of the client 230.

According to at least one embodiment of the present disclosure, only the KMS enclave attested by the bootstrapping enclave 210 among the one or more KMS enclaves 220 may receive the root key. The attested KMS enclave establishes a secure channel with the HSM 200 by using the root key. The attested KMS enclave may communicate with the HSM 200 through the secure channel of public key cryptography standard (PKCS) 11 application programming interface (API) call. Therefore, the attacker cannot generate a fake enclave in an attempt to access the HSM 200 or commit a middle attack.

At least one embodiment of the present disclosure generates, replaces, and manages the public key and private key pair of the HSM 200 which, when transmitting the public key to the bootstrapping enclave 210, is responsive to the presence of one or more KMS enclaves 220 that have received the public key from the bootstrapping enclave 210 for establishing a secure channel with the one or more KMS enclaves 220 by using the public key.

One or more KMS enclaves 220 according to at least one embodiment may increase to even more KMS enclaves generated according to the request of the client 230. One or more KMS enclaves 220 may be flexibly generated or destroyed in response to a request from the client 230, thereby providing a security service for the micro service to the client 230. Additional KMS enclaves to the one or more KMS enclaves 220 may be generated to provide various security services to the client 230 and may be removed after a certain time.

Figure 3:
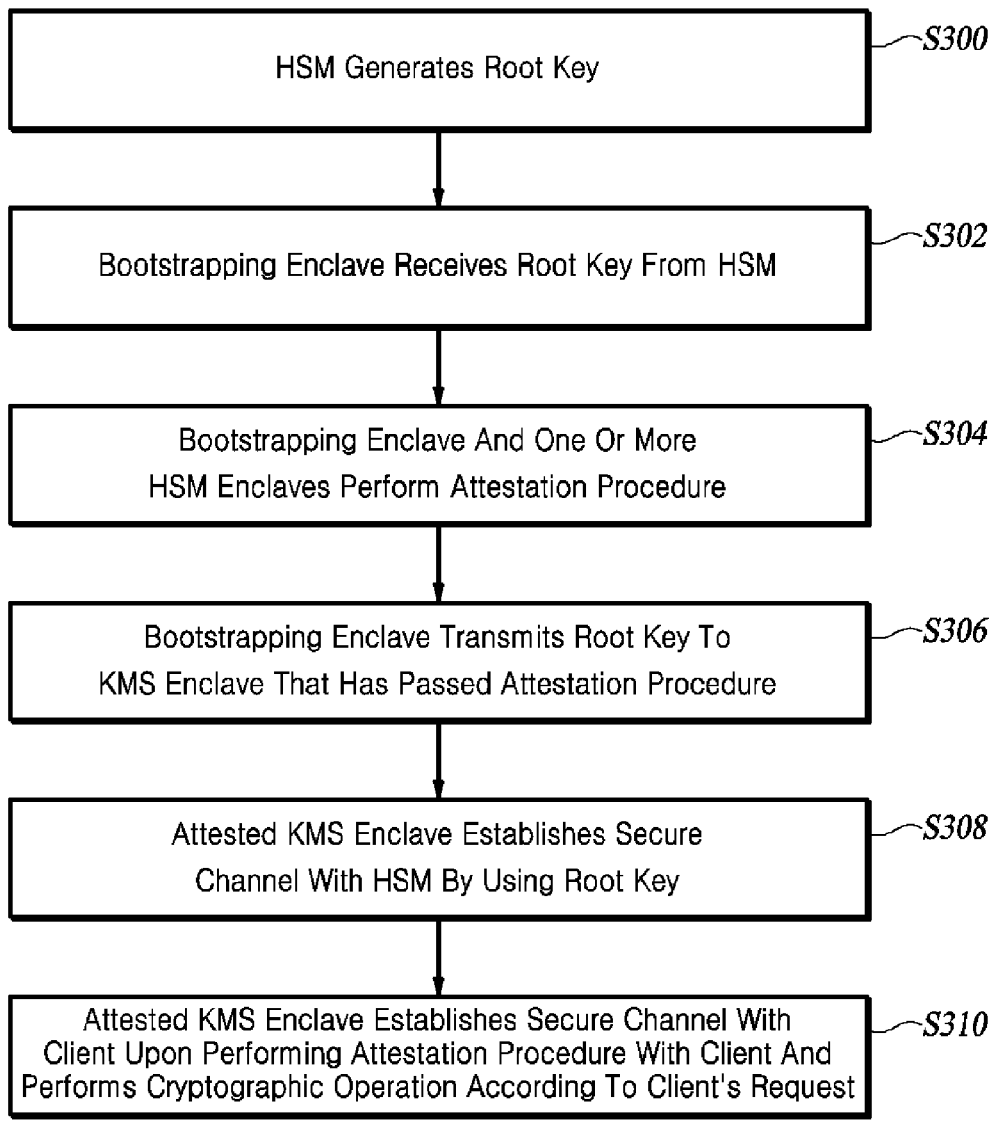
FIG. 3 is a flow chart for explaining the operation steps of a security system according to at least one embodiment of the present disclosure.

FIG. 3 is a flow chart for explaining the operation steps of a security system according to at least one embodiment of the present disclosure.

As shown in FIG. 3, an HSM generates a root key (S300). In addition to generating the root key, the HSM may replace or destroy the root key. The HSM according to at least one embodiment of the present disclosure may generate a public key and a private key and replace or destroy them. When the HSM generates public and private keys as the root key, the HSM sends the public key to a bootstrapping enclave. In addition, the HSM may further generate a session private key for establishing a secure channel, and the HSM may transmit the session private key to the bootstrapping enclave.

The bootstrapping enclave receives the root key from the HSM (S302). The bootstrapping enclave is a component that performs validation between the HSM and one or more KMS enclaves, and needs to be implemented by a trusted service provider.

The bootstrapping enclave and one or more KMS enclaves perform an attestation procedure (S304). This is a process for delegating the bootstrapping enclave to perform validation between one or more KMS enclaves and the HSM.

The bootstrapping enclave transmits the root key to the KMS enclave(s) that has passed the attestation procedure among the one or more KMS enclaves (S306). When the HSM generates a public key and a private key according to at least one embodiment of the present disclosure and sends either the public key or the private key to the bootstrapping enclave, the bootstrapping enclave send the received key from the HSM to the attested KMS enclave(s).

The attested KMS enclave receives the root key from the bootstrapping enclave and establishes a secure channel with the HSM by using the root key (S308). The attested KMS enclave may communicate with the HSM through the secure channel of public key cryptography standard (PKCS) 11 application programming interface (API) call.

The attested KMS enclave after the client's attestation establishes a secure channel with the client and performs a cryptographic operation in response to the client request (S310). The attested KMS enclave needs to perform an attestation procedure with a client after establishing a secure channel with the HSM. One or more KMS enclaves needs to perform an attestation procedure with the bootstrapping enclave and then perform an attestation procedure with a client before they can perform the cryptographic operation according to the client's request.

Although Steps S300 to S310 in FIG. 3 are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by FIG. 3 or by performing one or more of Steps S300 to S310 in FIG. 3 in parallel, without departing from the gist and the nature of the at least one embodiment of the present disclosure, and hence the steps in FIG. 3 are not limited to the illustrated chronological sequences.

The steps illustrated in FIG. 3 can be implemented as computer-readable codes on a computer-readable recording medium. The computer-readable recording medium include any type of recording device on which data that can be read by a computer system are recordable. Examples of the computer-readable recording medium include non-transitory medium such as a ROM, a RAM, a CD-ROM, a magnetic tape, a floppy disk, and an optical data storage and transitory medium such as a carrier wave (e.g., transmission through the Internet) and data transmission medium. Further, the computer-readable recording medium can be distributed in computer systems connected via a network, wherein the computer-readable codes can be stored and executed in a distributed mode.

As described above, according to at least one embodiment, the present disclosure utilizes the hardware security module (HSM) for key management and the key management module (KMS) enclave for processing the client's cryptographic operation request, and thereby guarantees both service scalability and security, and the present disclosure utilizes the bootstrapping enclave to ensure the reliability between the HSM and the KMS enclave.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A security system, comprising:
a hardware security module (HSM) configured to generate a root key;
a bootstrapping enclave configured to receive offline the root key generated by the HSM; and
at least one key management service (KMS) enclave configured to perform an attestation procedure with the bootstrapping enclave,
wherein an attested KMS enclave, from the at least one KMS enclave, is configured to, receive the root key from the bootstrapping enclave, and configured to establish a first secure channel with the HSM by using the root key, and
wherein the HSM is physically separate from the bootstrapping enclave and the at least one KMS enclave, and wherein the bootstrapping enclave is implemented by a trusted service provider, and configured to prevent a fake enclave from accessing the HSM by using the attestation procedure.

2. The security system of claim 1, wherein the bootstrapping enclave is configured to transmit the root key only to the attested KMS enclave from the at least one KMS enclave.

3. The security system of claim 1, wherein the attested KMS enclave establishes a second secure channel with a client upon performing an attestation procedure with the client and performs a cryptographic operation according to a client's request, the client's request being received through the second secure channel.

4. The security system of claim 1, wherein an additional number of a KMS enclave is generated based on a request from a client, the additional number of the KMS enclave being added to the at least one KMS enclave.

5. The security system of claim 1, wherein the root key is a public key, and the HSM further generates a private key paired with the public key.

6. The security system of claim 5, wherein the attested KMS enclave is configured to encrypt data by using the public key, and the HSM is configured to decrypt encrypted data by using the private key.

7. A method of operating a security system, the method comprising:
generating a root key by a hardware security module (HSM);
receiving offline, by a bootstrapping enclave, the root key generated by the HSM;
performing, by the bootstrapping enclave an attestation procedure with at least one key management service (KMS) enclave;
transmitting the root key by the bootstrapping enclave to an attested KMS enclave, from the at least one KMS enclave; and
establishing, by the attested KMS enclave, a first secure channel with the HSM by using the root key,
wherein the HSM is physically separate from the bootstrapping enclave and the at least one KMS enclave, and
wherein the bootstrapping enclave is implemented by a trusted service provider, and configured to prevent a fake enclave from accessing the HSM by using the attestation procedure.

8. The method of claim 7, wherein the bootstrapping enclave is configured to transmit the root key only to the attested KMS enclave from the at least one KMS enclave.

9. The method of claim 7, wherein the attested KMS enclave establishes a second secure channel with a client upon performing an attestation procedure with the client and performs a cryptographic operation according to a client's request, the client's request being received through the second secure channel.

10. The method of claim 7, wherein an additional number of a KMS enclave is generated based on a request from a client, the additional number of the KMS enclave being added to the at least one KMS enclave.

11. The method of claim 7, wherein when the root key is a public key, and the HSM further generates a private key paired with the public key.

12. The method of claim 11, wherein the attested KMS enclave is configured to encrypt data by using the public key, and the HSM is configured to decrypt encrypted data by using the private key.

* * * * *